Feb. 10, 1931.  K. KRUENING  1,792,171
LENS MOUNT
Filed Jan. 25, 1928
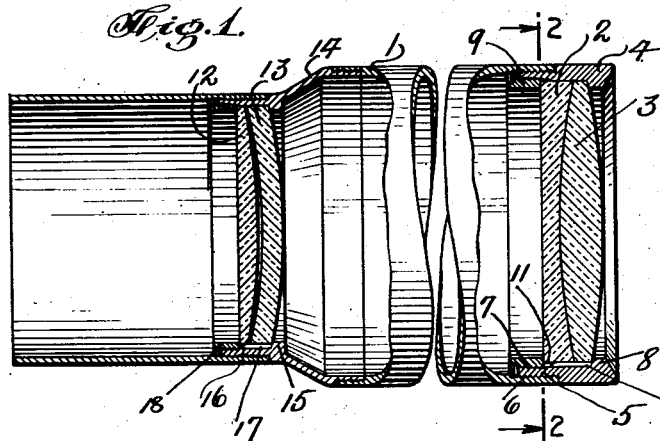
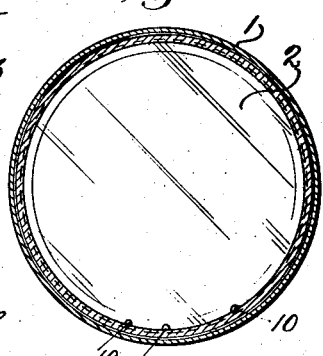
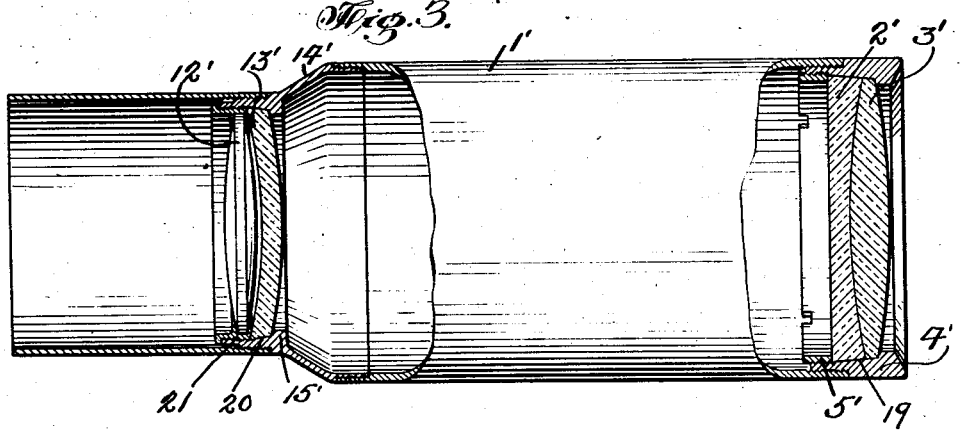
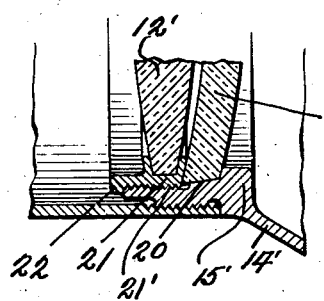
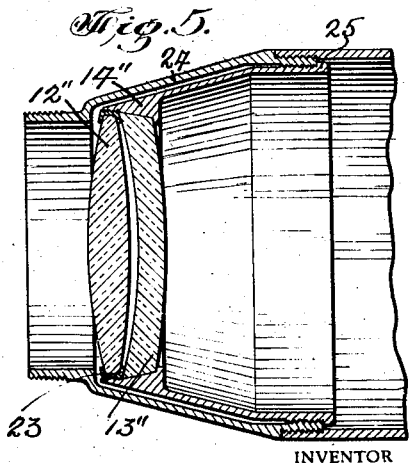
INVENTOR
Karl Kruening.
BY
Kiddle and Margeson.
ATTORNEYS.

Patented Feb. 10, 1931

1,792,171

UNITED STATES PATENT OFFICE

KARL KRUENING, OF JAMAICA, NEW YORK, ASSIGNOR TO KOLLMORGEN OPTICAL CORPORATION, OF BROOKLYN, NEW YORK, A CORPORATION OF NEW YORK

LENS MOUNT

Application filed January 25, 1928. Serial No. 249,223.

This invention relates to mounts for lenses and has particular reference to the mounting of projection lenses in the motion picture industry. Such a lens system is usually composed of four lenses, one pair being cemented together and termed the front element, while the two lenses of the other set are usually uncemented. The uncemented lenses for descriptive purposes will be referred to as the rear element. These lenses must be removed from their mounts from time to time for cleaning purposes and as this is done usually by the operator of the projection machine, the lenses either through ignorance or carelessness, are often reversed or become inserted in the wrong position, resulting in images of very poor quality. The present invention has for an object the provision of a construction wherein this possibility is overcome.

I have shown several embodiments of my invention as illustrating various ways of accomplishing my purpose.

In the accompanying drawings,

Fig. 1 is a view in side elevation partly in section of a lens system constructed in accordance with this invention;

Fig. 2 is a section on the line 2—2 of Fig. 1;

Fig. 3 is a view similar to Fig. 1 of a modified form of my invention;

Fig. 4 is a fragmentary sectional view on an enlarged scale of the rear element of the projecting apparatus of Fig. 3; and Fig. 5 is a further modification.

Referring to the drawings in detail and first of all to Figs. 1 and 2, 1 designates the lens tube of my improved mount. The front element of this projecting apparatus is composed of two lenses 2 and 3 which, as illustrated, are cemented together. Threaded into the forward end of the tube 1 is a retaining ring 4, provided with a reduced portion 5 threaded externally as indicated at 6 and internally as indicated at 7. The retaining ring 4 is provided adjacent its outer end with a shoulder 8 conveniently provided by reducing the diameter of the interior of the ring at this point.

The lenses 2 and 3 fit within the retaining ring 4 and are slipped into the ring from the inner end thereof until they abut the shoulder 8. A clamping ring 9 screws into the inner end of the retaining ring 4 and clamps the lenses as a unit against the shoulder 8, to hold the lenses securely and firmly in position.

In order that the lenses 2 and 3 may not be reversed and must always be placed in the ring 4 in correct position, I provide the interior of the retaining ring with inwardly extending projections or ribs 10, shown as extending lengthwise of the ring 4. These projections or ribs may take various forms but are unequally spaced from each other as apparent from an inspection of Fig. 2. The lenses 2 and 3 are provided in their periphery with slots 11, spaced to correspond to the spacing of the projections 10 on the ring 4, thereby preventing the lenses from being placed in the mount in other than the correct position, inasmuch as if the lenses were reversed the slots or grooves 11 in their peripheries would no longer register with the projections 10 on the ring and it would be impossible to insert the lenses into the retaining tube 4.

The rear element of this embodiment of my invention comprises the lenses 12 and 13 of a different diameter than the front element and hence not interchangeable therewith. 14 designates a retaining tube threaded into the main tube 1. The retaining tube is provided with an internal shoulder 15. The lenses 12 and 13 are not cemented to each other and have their peripheries notched as at 16, which notches are unequally spaced and cooperate with unequally spaced ribs projecting inwardly within the retaining tube 14. The number of notches and ribs, or their equivalent, for the lens 13 exceeds that for the lens 12 from which it will be evident reversal of these two lenses is effectually prevented. The lenses are held in position in the ring 14 by a clamping ring 18 which screws into the internally threaded end of the retaining tube 14. This clamping ring is of such a length that if the lenses 12 and 13 are interchanged the ring cannot be screwed into its bearing.

It will be seen from the foregoing that the front and rear elements of my lens system are non-interchangeable owing to their difference in diameter. It is to be noted also that by spacing the ribs 10 and slots 11 of the front element differently from the spacing of the ribs and slots 17 and 18 of the rear element the two sets cannot be interchanged even though the lenses composing the two elements were all of the same diameter.

It will also be evident that my construction prevents reversal of the lenses of each element.

In the embodiment of my invention illustrated in Figs. 3 and 4, I have varied the construction just described. The front element composed of the two lenses 2' and 3' cemented together, is clamped in a retaining tube 4' by a clamping ring 5. The lenses 2' and 3' are provided with a tapered periphery as indicated at 19 while the interior of the tube 4' is correspondingly tapered, and insertion of these lenses in reversed position is positively prevented.

The rear element composed of the separate lenses 12' and 13' are not only smaller in diameter than the front element and hence non-interchangeable therewith, but are of different construction.

The retaining ring 14' which screws into the tube 1' is tapered internally as indicated at 20, and shouldered at 15'. The lens 13' is correspondingly tapered and hence can only be inserted correctly. The lens 12' is provided with a clamping ring 21 spun about its periphery, the periphery of this clamping ring being threaded as indicated at 21' so as to screw into the tube 14'. To prevent this lens and ring from being reversed the end portion 22 is of larger diameter than the threaded portion. Obviously these lenses can not be interchanged.

In Fig. 5 the retaining tube 14'' which receives the lenses 12'' and 13'' of a rear element is tapered internally. The lens 13'' is correspondingly tapered. The lens 12'' is provided with a ring 23 spun about the same. This ring is tapered and is threaded on its exterior to screw into the retaining tube 14''. The retaining tube 14'' screws into an outer tube 24, and is enlarged at its end as indicated at 25 so that it cannot be reversed in the tube 24. Obviously the two lenses 12'' and 13'' cannot be reversed or interchanged.

In all the forms shown and described above, therefore, I have provided a construction whereby the front and rear elements of the lens system of a projection machine can not be interchanged and a construction wherein the lenses making up each element cannot be reversed or interchanged.

What I claim is:—

1. In projector apparatus, the combination of a pair of lenses, a retaining tube therefor, the bore of said tube being tapered throughout part of its length, the outer end of said bore being threaded, one of said lenses having its periphery tapered to fit the tapered portion of said bore to prevent reversal of said lens, a clamping ring for the other lens, said ring being threaded externally to be received by the threaded portion of the bore of the retaining tube to prevent interchanging of the two lenses and the external diameter of a portion of said ring being greater than that of the remaining portion of the ring to prevent reversal of the ring and its lens in said bore.

2. In projector apparatus, a pair of separable lenses, a retaining tube therefor having a tapered bore for the reception of said lenses, the periphery of one of said lenses being smooth and tapered to fit said bore, the periphery of the other lens being smooth and straight, a clamping ring spun over the periphery of the last mentioned lens, said ring being tapered externally and threaded into the tapered bore of said retaining tube.

3. In projector apparatus, the combination of a lens tube, a retaining tube threaded into said lens tube, said retaining tube having its end adjacent the threaded portion enlarged to prevent reversal of the retaining tube in the lens tube, said retaining tube having a tapered bore, the outer portion of which bore is threaded, a lens having a tapered periphery and adapted to fit the inner unthreaded portion of the tapered bore of the retaining tube, a second lens cooperating with the first lens, a tapered clamping ring carried by said second lens, the periphery of the clamping ring being tapered and threaded to fit the threaded tapered portion of the bore of the retaining tube.

This specification signed this 23rd day of January, 1928.

KARL KRUENING.